(12) United States Patent
Feng et al.

(10) Patent No.: US 11,994,065 B2
(45) Date of Patent: May 28, 2024

(54) AIR SUPPLY DEVICE, GAS TURBINE SYSTEM AND USING METHOD THEREOF

(71) Applicant: YANTAI JEREH PETROLEUM EQUIPMENT & TECHNOLOGIES CO., LTD., Shandong (CN)

(72) Inventors: Ning Feng, Shandong (CN); Tao Kou, Shandong (CN); Ting Zhang, Shandong (CN); Yichao Mou, Shandong (CN); Libin Zhou, Shandong (CN); Xin Li, Shandong (CN); Xu Liu, Shandong (CN); Lili Wang, Shandong (CN); Jianglei Zou, Shandong (CN); Qiong Wu, Shandong (CN); Wanchun Zha, Shandong (CN); Cong Zhang, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 133 days.

(21) Appl. No.: 17/687,182

(22) Filed: Mar. 4, 2022

(65) Prior Publication Data
US 2023/0015132 A1      Jan. 19, 2023

(30) Foreign Application Priority Data

Jul. 15, 2021   (CN) .......................... 202110799641.8

(51) Int. Cl.
*F02C 7/045*       (2006.01)
*F02C 7/05*        (2006.01)

(52) U.S. Cl.
CPC ................ *F02C 7/045* (2013.01); *F02C 7/05* (2013.01); *F05D 2240/91* (2013.01);
(Continued)

(58) Field of Classification Search
CPC ...... F02C 6/00; F02C 7/24; F02C 7/32; F02C 7/04; F02C 7/055; F05D 2260/02;
(Continued)

(56) References Cited

U.S. PATENT DOCUMENTS 6,765,304 B2   7/2004 Baten et al.
9,534,473 B2 * 1/2017 Morris ...................... F02C 3/04
(Continued)

FOREIGN PATENT DOCUMENTS

| CN | 107859536 A | 3/2018 |
| CN | 210289932 U | 4/2020 |
| CN | 113339139 A | 9/2021 |

*Primary Examiner* — Craig Kim
(74) *Attorney, Agent, or Firm* — Crowell & Moring LLP (57) ABSTRACT

An air supply device, a gas turbine system and a using method thereof are disclosed. In the air supply device, an air intake compartment includes a connection end; a combustion air intake filter is located in the air intake compartment and connected with the combustion air intake filter; a combustion air intake interface is located on a tail plate and is connected with the combustion air silencer; and a sound insulation turnover mechanism includes a sound insulation flap and a turnover mechanism, the air intake compartment includes a first bottom plate and the tail plate that is located at the connection end, the sound insulation flap is located at the connection end, and the turnover mechanism is connected with the sound insulation flap, and is configured to drive the sound insulation flap to rotate relative to the tail plate.

17 Claims, 6 Drawing Sheets

(52) U.S. Cl.
CPC .... *F05D 2260/30* (2013.01); *F05D 2260/607* (2013.01); *F05D 2260/608* (2013.01); *F05D 2260/96* (2013.01)

(58) Field of Classification Search
CPC .. F05D 2240/90; F05D 2260/96; F04B 17/05; F04B 2203/11; F02B 63/047; F02B 2063/045; F02B 63/044; F02B 63/04; F16M 3/00; F16M 1/00
See application file for complete search history.

(56) References Cited

U.S. PATENT DOCUMENTS

| | | | |
|---|---|---|---|
| 9,802,584 B2* | 10/2017 | Sethi | B60S 9/02 |
| 10,030,579 B2 | 7/2018 | Austin et al. | |
| 10,184,397 B2 | 1/2019 | Austin et al. | |
| 11,560,848 B2* | 1/2023 | Yeung | F01D 25/30 |
| 11,598,477 B1* | 3/2023 | Seldenrust | F01D 15/10 |
| 11,627,683 B2* | 4/2023 | Yeung | E21B 43/26 |
| | | | 361/695 |
| 11,643,915 B2* | 5/2023 | Yeung | F02C 6/00 |
| | | | 290/52 |
| 2003/0057704 A1* | 3/2003 | Baten | F02B 63/04 |
| | | | 290/3 |
| 2016/0177678 A1 | 6/2016 | Morris et al. | |
| 2018/0041093 A1* | 2/2018 | Miranda | H02K 7/1823 |
| 2019/0063263 A1* | 2/2019 | Davis | E21B 43/2607 |
| 2019/0204021 A1 | 7/2019 | Morris et al. | |
| 2021/0025324 A1* | 1/2021 | Morris | H02K 7/1823 |
| 2021/0308638 A1* | 10/2021 | Zhong | B01F 23/59 |
| 2021/0388760 A1* | 12/2021 | Feng | F02C 6/00 |
| 2022/0090476 A1* | 3/2022 | Zhang | E21B 35/00 |
| 2022/0112892 A1* | 4/2022 | Cui | E21B 43/2607 |
| 2022/0235642 A1* | 7/2022 | Zhang | F02C 7/06 |
| 2022/0258659 A1* | 8/2022 | Cui | B60G 11/27 |
| 2022/0290549 A1* | 9/2022 | Zhang | F04B 17/05 |
| 2022/0341362 A1* | 10/2022 | Feng | F02B 63/047 |

\* cited by examiner

AIR SUPPLY DEVICE, GAS TURBINE SYSTEM AND USING METHOD THEREOF

CROSS REFERENCES TO RELATED APPLICATIONS

The present application is based on and claims priority to Chinese Patent Application No. 202110799641.8 filed on Jul. 15, 2021. For all purposes, the disclosure of the Chinese Application is incorporated herein by reference in its entirety as part of this present application.

TECHNICAL FIELD

The embodiment of the present disclosure relates to an air supply device, a gas turbine system and a method thereof.

BACKGROUND

With a continuous development of electric drive technology, there are more and more electric driven equipment and power consumption scenarios. Usually, electricity is provided by permanent power plants and fixed power grids; however, due to a variety of reasons, permanent power plants and fixed power grids cannot meet the power demand of users. For example, in a case that the electricity demand of users increases rapidly, the electricity demand of users may exceed an amount of electricity that can be generated by the permanent power plants. For another example, in a case that the grid capacity is insufficient or the permanent power plants' power generation is insufficient due to maintenance, failure, lack of fuel, and so on, the power demand may exceed the grid capacity or the permanent power plant's power generation, so that power outages will be caused. For another example, in a case that natural disasters such as typhoons and earthquakes damage the power grids or power equipment, power outages will be caused. For another example, in some construction sites and mine scenes where no power grid is provided, the power demand cannot be met or the cost of laying the power grid is high.

In this regard, a mobile power generation device can provide a power generation device that can be moved or transported. Therefore, the mobile power generation device can be transported to various scenarios with insufficient or no power, so that the power demand of users can be met. On the other hand, the gas turbine power generation device is a small, light, high-efficiency, high-power power generation device, and is suitable for application in mobile power generation devices. In a gas turbine power generation device, an air supply system occupies an important position, which can provide combustion-supporting air for combustion and ventilation air for cooling.

SUMMARY

Embodiments of the present disclosure provide an air supply device, a gas turbine system, and a using method of the gas turbine system. The air supply device can drive a sound insulation flap to turn outward relative to a center of a tail plate through the turnover mechanism, can quickly expose a combustion air inlet interface to quickly connect with the gas turbine device, so as to improve the installation and combination speed of a gas turbine power generation device, and can also drive the sound insulation flap to turn inward relative to the center of the tail plate through the turnover mechanism, and in a case that the gas turbine device works, it forms a sound insulation cabin with the gas turbine device, so as to reduce the noise at the combustion air inlet interface.

At least one embodiment of the present disclosure provides an air supply device, which includes: an air intake compartment, comprising a connection end, and the connection end being configured to be connected with a gas turbine device; a combustion air intake filter, located in the air intake compartment; a combustion air intake silencer, located in the air intake compartment and connected with the combustion air intake filter; a combustion air intake interface, connected with the combustion air silencer; and a sound insulation turnover mechanism, comprising a sound insulation flap and a turnover mechanism, the air intake compartment comprises a first bottom plate and a tail plate that is located at the connection end, the tail plate is intersected with the first bottom plate, the combustion air intake interface is located on the tail plate, and the sound insulation flap is located at the connection end, and the turnover mechanism is connected with the sound insulation flap, and is configured to drive the sound insulation flap to rotate relative to the tail plate.

For example, in the air supply device provided by an embodiment of the present disclosure, the sound insulation flap comprises a first sub sound insulation flap, the first sub sound insulation flap is hingedly connected with a first edge of the connection end away from the first bottom plate, and the turnover mechanism comprises a first sub turnover mechanism, the first sub turnover mechanism is respectively connected with the first sub sound insulation flap and the tail plate, and the first sub turnover mechanism is configured to drive the first sub sound insulation flap to rotate relative to the tail plate.

For example, in the air supply device provided by an embodiment of the present disclosure, the sound insulation flap comprises a second sub sound insulation flap and a third sub sound insulation flap, the second sub sound insulation flap is hingedly connected with a second edge of the connection end adjacent to the first edge, the third sub sound insulation flap is hingedly connected with a third edge of the connection end adjacent to the first edge, and the second edge and the third edge are two opposite edges of the connection end.

For example, in the air supply device provided by an embodiment of the present disclosure, the first bottom plate further comprises a bottom plate extension portion, the bottom plate extension portion extends from the connection end in a direction away from the tail plate, and the bottom plate extension portion, the first sub sound insulation flap, the second sub sound insulation flap, and the third sub sound insulation flap are configured to enclose a sound insulation cabin with the gas turbine device.

For example, in the air supply device provided by an embodiment of the present disclosure, a silencing structure is arranged on a side of the sound insulation flap close to a center of the tail plate.

For example, the air supply device provided by an embodiment of the present disclosure further includes: a combustion air intake hose; and a hose support arm, an end of the combustion air intake hose is connected with the combustion air intake interface, another end of the combustion air intake hose is configured to be connected with the gas turbine device, one end of the hose support arm is connected with the tail plate, another end of the hose support arm is connected with the combustion air intake hose, and is configured to support the combustion air intake hose.

For example, the air supply device provided by an embodiment of the present disclosure further includes: a vertical plate, the vertical plate is detachably connected with the sound insulation turnover mechanism, and is configured to form an accommodating space with the sound insulation turnover mechanism, and the combustion air intake hose and the hose support arm are located in the accommodating space.

For example, the air supply device provided by an embodiment of the present disclosure further includes: a ventilation air intake filter, located in the air intake compartment; a ventilation air intake fan, located in the air intake compartment and connected with the ventilation air intake filter; and a ventilation air intake interface, located on the tail plate and is connected with the ventilation air intake fan.

For example, in the air supply device provided by an embodiment of the present disclosure, the combustion air intake silencer comprises a first sub air intake silencer and a second sub air intake silencer, the first sub air intake silencer is connected with the combustion air intake filter, the second sub air intake silencer is connected with the combustion air intake interface, a radial size of the second sub air intake silencer is smaller than a size of the first sub air intake silencer, the ventilation air intake filter is located around the first sub air intake silencer, the ventilation air intake fan is located on a side of the second sub air intake silencer close to the first bottom plate, and the ventilation air intake interface is located on a side of the combustion air intake interface close to the first bottom plate.

For example, in the air supply device provided by an embodiment of the present disclosure, two ventilation air intake interfaces are provided, the two ventilation air intake interfaces are respectively located on a side of the combustion air intake interface close to the first bottom plate, and are respectively located on two sides of the combustion air intake interface in a direction parallel to the first bottom plate.

For example, in the air supply device provided by an embodiment of the present disclosure, the air intake compartment comprises a filter compartment and a silencing compartment arranged in sequence in a length direction of the first bottom plate, the combustion air intake filter is located in the filter compartment, and the combustion air intake silencer is located in the silencing compartment.

For example, in the air supply device provided by an embodiment of the present disclosure, the combustion air intake filter comprises a plurality of sub combustion air intake filters, is located at an edge of the first bottom plate of the filter compartment, and is as a side plate of the filter compartment.

For example, in the air supply device provided by an embodiment of the present disclosure, the combustion air intake silencer comprises a silencer connection portion, the silencer connection portion connects the first sub air intake silencer and the second sub air intake silencer, and in a direction from the first sub air intake silencer to the second sub air intake silencer, a radial size of the silencer connection portion gradually decreases.

For example, the air supply device provided by an embodiment of the present disclosure further includes: a walking mechanism, the walking mechanism is configured to carry and transport the air intake compartment.

At least one embodiment of the present disclosure further provides a gas turbine system, which includes the abovementioned air supply device and a gas turbine device, comprising a gas turbine and an air intake cylinder, an end of the air intake cylinder is communicated with the gas air intake interface of the air supply device, and another end of the air intake cylinder is connected with the gas turbine.

For example, in the gas turbine system provided by an embodiment of the present disclosure, the gas turbine device comprises a second bottom plate, the gas turbine is located on the second bottom plate, the air intake compartment comprises a first top plate arranged opposite to the first bottom plate, the gas turbine device comprises a second top plate arranged opposite to the second bottom plate, and a distance between the first top plate and the first bottom plate is greater than a distance between the second top plate and the second bottom plate.

For example, the gas turbine system provided by an embodiment of the present disclosure further includes a ventilation air intake hose, an end of the ventilation air intake hose is connected with the ventilation air intake interface, another end of the ventilation air intake hose is configured to be connected to the gas turbine device.

At least one embodiment of the present disclosure further provides a using method of the abovementioned gas turbine system, the using method includes: transporting the gas turbine device and the air supply device to a first designated position; turning the sound insulation flap outward in a direction away from a center of the tail plate, to expose the combustion air intake interface of the air supply device; aligning the air supply device with the gas turbine device, and connecting the combustion air intake interface with the gas turbine device through a combustion air intake hose; and turning the sound insulation flap inward in a direction close to the center of the tail plate, and connecting the sound insulation flap with the gas turbine device, to form a sound insulation cabin.

For example, the using method provided by an embodiment of the present disclosure further includes: fixing an end of the sound insulation flap away from the air intake compartment with the gas turbine device.

For example, the using method provided by an embodiment of the present disclosure further includes: after forming the sound insulation cabin, turning the sound insulation turnover device outward in a direction away from the center of the tail plate, to expose the combustion air intake hose; maintaining a state that the combustion air intake hose connects the combustion air intake interface with the gas turbine device, using a hinged structure to hinge the air supply device and the gas turbine device; and transporting the air supply device and the gas turbine device as a whole to a second designated position.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure. Wherein.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect.

A gas turbine power generation device is a small, light, high-efficiency and high-power power generation device, thus the gas turbine power generation device can be transported to various scenarios with insufficient power or no power, to meet the power demand of users. Generally, a gas turbine power generation device includes a gas turbine device, an air supply device, and a power generation device, in the case that they are transported to the designated scene, they need to be installed and assembled on site, and electricity can be generated after the installation and combination are completed. Therefore, speed of installation and combination of the gas turbine power generation device can be increased to more quickly meet the power demand of users. On the other hand, the noise of the gas turbine power generation device is relatively large during operation, thus it will cause trouble to users. Therefore, how to reduce the noise of the gas turbine power generation device is also an urgent problem to be solved.

In this regard, the embodiments of the present disclosure provide an air supply device, a gas turbine system and a using method thereof. The air supply device includes an air intake compartment, a combustion air intake filter, a combustion air intake filter, a combustion air intake interface, and a sound insulation turnover mechanism; the air intake compartment includes a connection end, which is used for connecting with a gas turbine device; the combustion air intake filter is located in the intake compartment, the combustion air intake silencer is located in the air intake compartment, and is connected with the combustion air intake filter; the combustion air intake interface is located on a tail plate, and is connected with the combustion air intake silencer; the sound insulation turnover mechanism includes a sound insulation flap and a turnover mechanism, the air intake compartment includes a first bottom plate and a tail plate at the connection end, the tail plate intersects with the first bottom plate, the sound insulation flap is located at the connection end, the turnover mechanism is connected with the sound insulation flap, and is configured to drive the sound insulation flap to rotate relative to the tail plate. In this way, the air supply device can drive the sound insulation flap to turn outward relative to a center of the tail plate through the above turnover mechanism, a combustion air intake port can be quickly exposed to quickly connect with the gas turbine device, so that a speed of the installation and combination of the gas turbine power generation device can be increased, in addition, the above-mentioned turnover mechanism can drive the sound insulation flap to turn inward with respect to the center of the tail plate, and the sound insulation flap forms a sound insulation cabin with the gas turbine device in a case that the gas turbine device works, so that the noise at the combustion air intake interface is reduced.

Hereinafter, an air supply device, a gas turbine system and a using method thereof provided by the embodiments of the present disclosure will be described in detail with reference to the accompanying drawings.

Figure 1A:
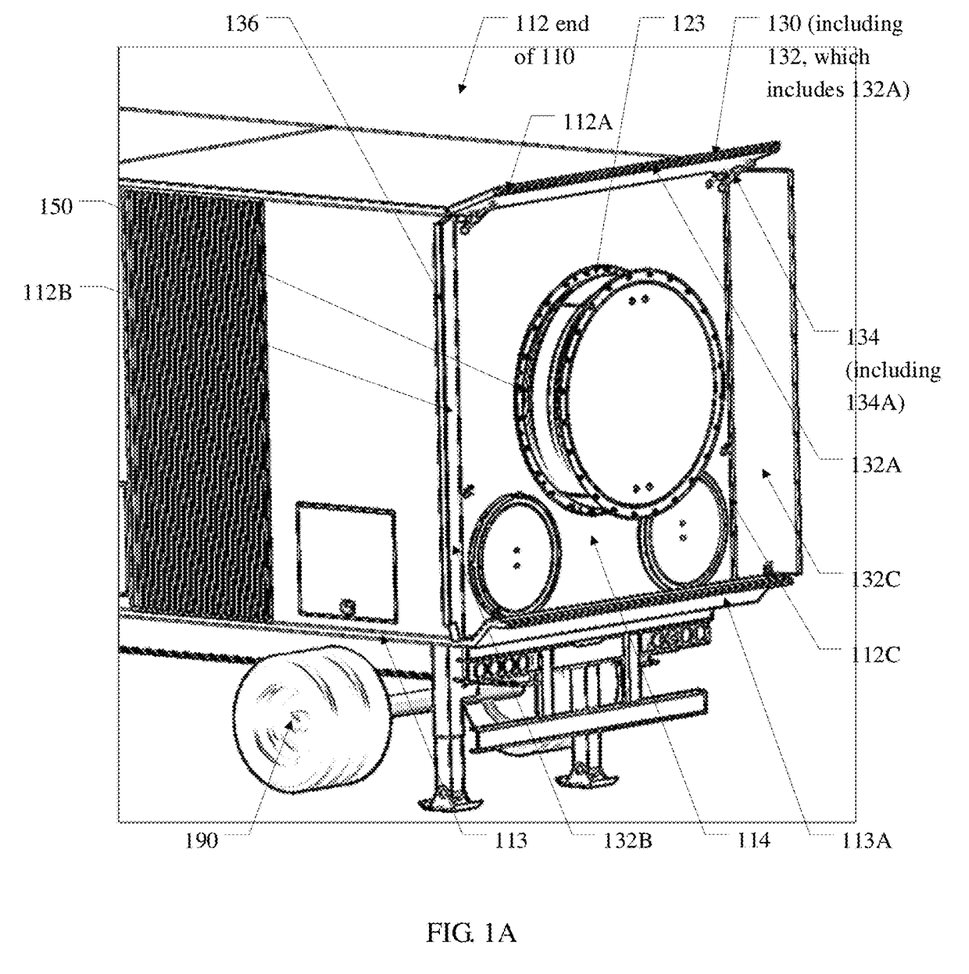
FIGS. 1A to 1B are structural schematic diagrams of an air supply device provided by an embodiment of the present disclosure.
Figure 1B:
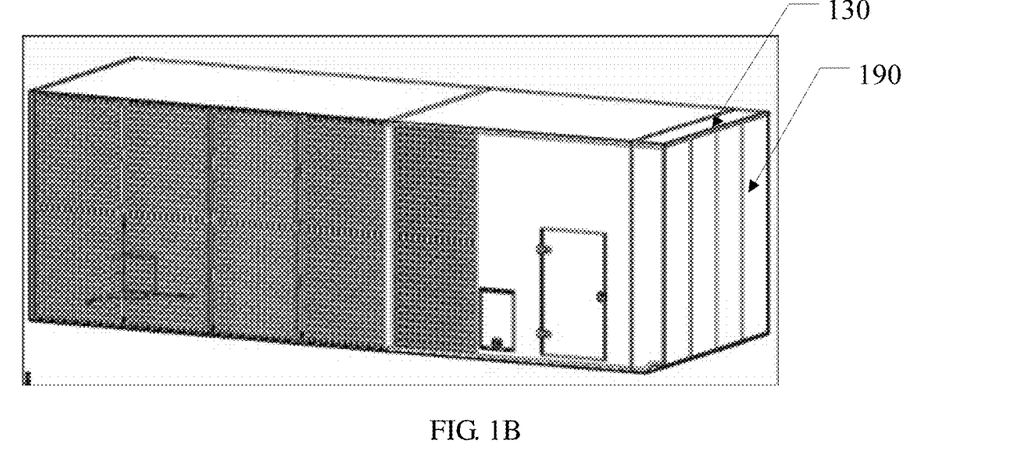
Figure 1C:
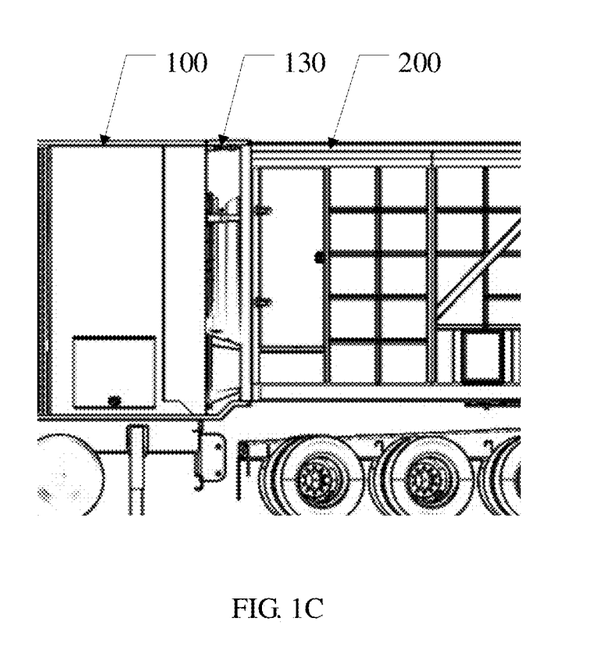
FIG. 1C is a schematic diagram of a connection between an air supply device and a gas turbine device according to an embodiment of the present disclosure.
Figure 2A:
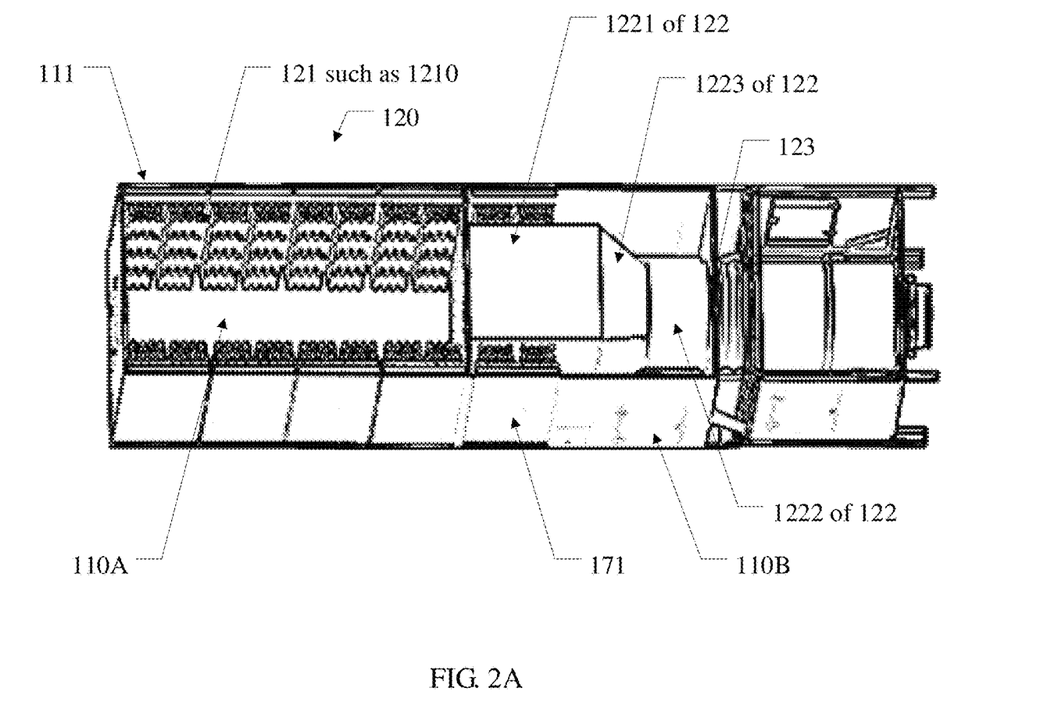
FIG. 2A is a perspective diagram of an air supply device provided by an embodiment of the present disclosure.
Figure 2B:
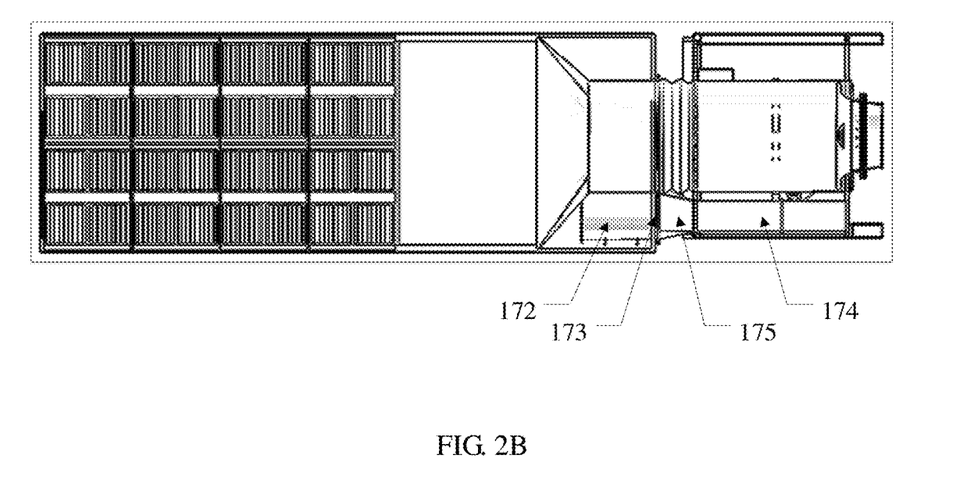
FIG. 2B is a perspective diagram of another air supply device provided by an embodiment of the present disclosure.

An embodiment of the present disclosure provides an air supply device. FIGS. 1A to 1B are structural schematic diagrams of an air supply device provided by an embodiment of the present disclosure; FIG. 1C is a schematic diagram of a connection between an air supply device and a gas turbine device according to an embodiment of the present disclosure. The sound insulation turnover mechanism in the air supply device shown in FIG. 1A is in an open state. The sound insulation turnover mechanism in the air supply device shown in FIG. 1B is in a closed state. FIG. 2A is a perspective diagram of an air supply device provided by an embodiment of the present disclosure; FIG. 2B is a perspective diagram of another air supply device provided by an embodiment of the present disclosure.

As shown in FIGS. 1A and 2A, the air supply device 100 includes an air intake compartment 110, a combustion air intake filter 121, a combustion air intake silencer 122 and a combustion air intake interface 123. The air intake compartment 110 includes a connection end 112 for connecting with a gas turbine device; the combustion air intake filter 121 is located in the air intake compartment 110, the combustion air intake silencer 122 is located in the air intake compartment 110, and is connected with the combustion air intake filter 121; the combustion air intake interface 123 is connected with the combustion air intake silencer 122. At this time, the combustion air intake filter 121, the combustion air intake silencer 122, and the combustion air intake interface 123 may constitute a combustion air intake system 120, in which air can be filtered by the combustion air intake filter 121, then through the combustion air intake silencer 122 to the combustion air intake interface 123, so that combustion-supporting air can be provided to a gas turbine connected to the combustion air intake interface 123.

As shown in FIG. 1A, the air supply device 100 further includes a sound insulation turnover mechanism 130; the sound insulation turnover mechanism 130 includes a sound insulation flap 132 and a turnover mechanism 134, the air intake compartment 110 includes a first bottom plate 113 and a tail plate 114 located at the connection end 112, the tail plate 114 and the first bottom plate 113 are arranged to intersect each other, the sound insulation flap 132 is located at the connection end 112, the turnover mechanism 134 is connected with the sound insulation flap 132 and is configured to drive the sound insulation flap 132 to rotate relative to the tail plate 114. It should be noted that the above-mentioned "arranged to intersect each other" refers to a situation where an angle between a plane where the tail plate is located and a plane where the first bottom plate is located is less than 180 degrees. For example, the angle between the plane where the tail plate is located and the plane where the first bottom plate is located may range from 45 degrees to 135 degrees.

In the air supply device provided by the embodiment of the present disclosure, the turnover mechanism is connected with the sound insulation flap, and is configured to drive the sound insulation flap to rotate relative to the tail plate. In this case, as shown in FIG. 1B, in a case that the air supply device 100 is transported to a designated position, the sound insulation turnover mechanism 130 and some detachable vertical plates 190 can form an enclosed space located behind the tail plate 114, the enclosed space can accommodate the combustion air intake interface 123 and other auxiliary equipments connected with the combustion air intake interface 123, such as combustion air intake hoses or a support arm, so that the combustion air intake interface and other auxiliary equipments connected with the combustion air intake interface can be protected during transportation; in a case that the air supply device is transported to the designated position, as shown in FIG. 1A, the sound insulation flap 132 can be driven to turn outward relative to the tail plate 114 by the above-mentioned turnover mechanism 134, so that the combustion air intake interface 123 and the auxiliary equipments connected with the combustion air intake interface 123 can be quickly exposed, thus a quick connection with the gas turbine device can be realized, and the auxiliary equipment itself is connected with the combustion air intake interface, so that the connection speed can be further improved; as shown in FIG. 1C, in a case that the air supply device 100 is connected with the gas turbine device 200 and is in a working state, the sound insulation flap 132 can be driven to turn inward with respect to the tail plate 114 through the above-mentioned turnover mechanism 134, and the sound insulation flap 132 will be connected with the gas turbine device 200, to form a sound insulation cabin. Since a high-frequency and high-decibel noise at an air intake of the gas turbine is easy to leak from a position where the combustion air intake interface is located, the above mentioned sound insulation cabin can effectively reduce the noise at the position of the combustion air intake interface. In this way, the air supply device can not only increase the installation and combination speed of the air supply device and the gas turbine device, and can also reduce the noise.

For example, as shown in FIGS. 1A and 2A, the air intake compartment 110 further includes an air intake end 111, the air intake end 111 is arranged opposite to the connection end 112 and is used for setting the above mentioned combustion air intake filter 121. Of course, the embodiments of the present disclosure include but are not limited to this, the combustion air intake filter can also be arranged in other positions of the air intake compartment according to actual requirements.

For example, as shown in FIGS. 1A and 2A, the tail plate 114 is substantially perpendicular to the first bottom plate 113, that is, a plane on which the tail plate 114 is located is substantially perpendicular to a plane on which the first bottom plate 113 is located. It should be noted that, the above mentioned that the tail plate is substantially perpendicular to the first bottom plate includes a case where the tail plate and the first bottom plate are perpendicular to each other, and also includes a case where an angle between the tail plate and the first bottom plate is in a range of 80 degrees to 100 degrees.

In some examples, as shown in FIG. 1A, the sound insulation flap 132 includes a first sub-sound insulation flap 132A, the turnover mechanism 134 includes a first sub-turnover mechanism 134A; the first sub-sound insulation flap 132A is hingedly connected with a first edge 112A of the connection end 112 away from the first bottom plate 113; the first sub-turnover mechanism 134A is respectively connected with the first sub-sound insulation flap 132A and the tail plate 114, and is configured to drive the first sub-sound insulation flap 132A to rotate relative to the tail plate 114. In this way, since the first sub-sound insulation flap is arranged on the first edge, that is, a top edge of the connection end, it is not suitable for an installer to manually flip; by arranging the above mentioned first sub-turnover mechanism, the installer can drive the first sub-sound insulation flap to rotate relative to the tail plate through the first sub-turnover mechanism.

Figure 3:
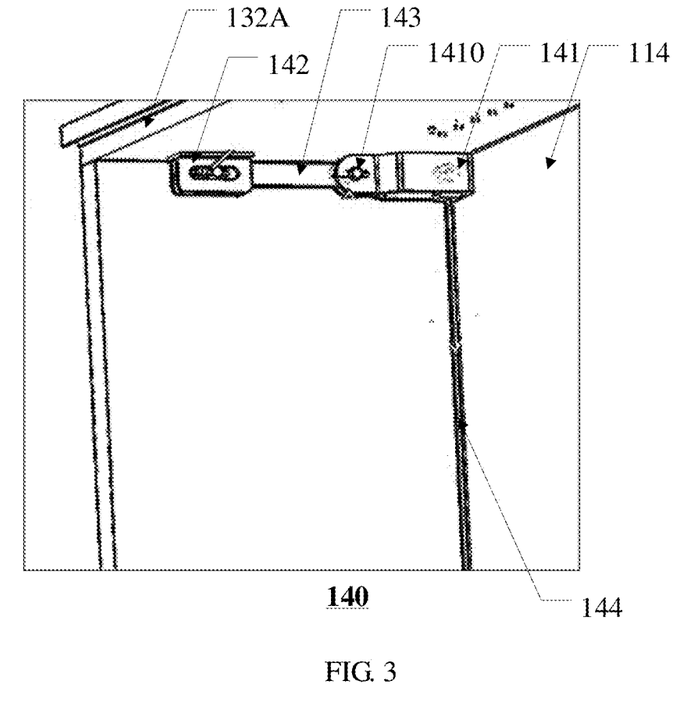
FIG. 3 is a schematic structural diagram of a turnover mechanism provided by an embodiment of the present disclosure.

FIG. 3 is a schematic structural diagram of a turnover mechanism provided by an embodiment of the present disclosure. As shown in FIG. 3, the first sub-turnover mechanism 134A may adopt a lever turnover mechanism 140, which includes a first connection part 141, a second connection part 142, a lever part 143 and a pull rod 144; an end of the first connection part 141 is fixedly connected with the tail plate 114, and the other end of the first connection part 141 is provided with a bearing 1410; the second connection part 142 is connected with the first sub-sound insulation flap 132A; an end of the lever part 143 is connected with the second connection part 142, the other end of the lever part 143 is connected with the pull rod 144, a middle part of the lever part 143 is connected with the bearing 1410, so that a lever mechanism can be formed. At this time, the pull rod 144 can be pulled downward to turn the first sub-sound insulation flap 132A outward relative to the center of the tail plate 114.

In some examples, as shown in FIG. 1A, the sound insulation flap 132 further includes a second sub-sound insulation flap 132B and a third sub-sound insulation flap 132C, the second sound insulation flap 132B is hingedly connected with a second edge 112B of the connection end 112 adjacent to the first edge 112A, the third sound insulation flap 132C is hingedly connected with a third edge 113C of the connection end 112 adjacent to the first edge 112A, and the second edge 112B and the third edge 112C are two opposite edges on the connection end 112. That is, the two opposite side edges of the connection end 112 may be respectively arranged with the above-mentioned second sub-sound insulation flap 132B and the third sub-sound insulation flap 132C respectively. Since the second sub-sound insulation flap 132B and the third sub-sound insulation flap 132C can extend to the first bottom plate 113, thus the installer can manually turn over the second sub-sound insulation flap 132B or the third sub-sound insulation flap 132C. In this case, as long as the second sub-sound insulation flap 132B is hinged with the second edge 112B, the third sub-sound insulation flap 132C can be hinged to the third edge 113C, and no additional turnover mechanism is required. Of course, the embodiments of the present disclosure include but are not limited to this, the turnover mechanism may also include sub-turnover mechanisms for driving the second sub-sound insulation flap and the third sub-sound insulation flap to turn over respectively.

In some examples, as shown in FIGS. 1A and 1C, the first bottom plate 113 further includes a bottom plate extension portion 113A, the bottom plate extension portion 113A extends from the connection end 112 in a direction away from the tail plate 114, that is, the bottom plate extension portion 113A is located at the end of the tail plate 114 close to the gas turbine device 200. At this time, the bottom plate extension portion 113A, the first sub-sound insulation flap 132A, the second sub-sound insulation flap 132B, and the third sub-sound insulation flap 132C are configured to enclose a sound insulation cabin with the gas turbine device 200. In this way, in a case that the gas turbine device 200 works, the combustion air intake interface 123 is located in the sound insulation cabin; the sound insulation cabin can greatly reduce the noise at the position of the combustion air intake interface 123.

In some examples, as shown in FIG. 1A, a side of the sound insulation flap 132 close to the center of the tail plate 114 is arranged with a silencing structure 136. For example, the silencing structure 136 may be a silencing cotton or other silencing structures.

Figure 4:
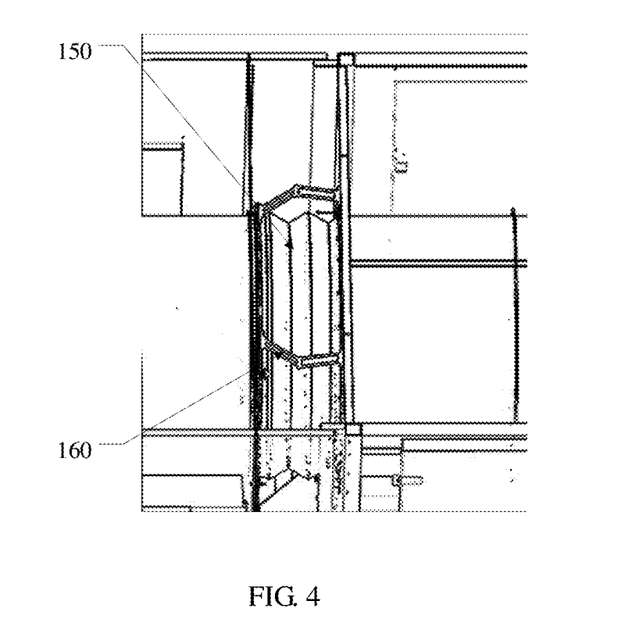
FIG. 4 is a partial schematic diagram of another air supply device provided by an embodiment of the disclosure.

FIG. 4 is a partial schematic diagram of another air supply device provided by an embodiment of the disclosure. As shown in FIG. 4, the air supply device 100 further includes a combustion air intake hose 150 and a hose support arm 160; an end of the combustion air intake hose 150 is connected with the combustion air intake interface 123, another end of the combustion air intake hose 150 is configured to be connected with the gas turbine device 200, so that the combustion air intake interface 123 can be connected with the gas turbine device 200; an end of the hose support arm 160 is connected with the tail plate 114, another end of the hose support arm 160 is connected with the combustion air intake hose 150, and is configured to support the combustion air intake hose 150. During the transportation of the air supply device, the above mentioned combustion air intake hose is in a state of being connected with the combustion air intake interface; in the process of installing and combining the air supply device and the gas turbine device, only the combustion air intake hose can be pulled out to communicate with the gas turbine device. In this way, the combustion air intake interface can be quickly connected with the gas turbine device through the combustion air intake hose mentioned above. In addition, the hose support arm can support the combustion air intake hose, on the one hand, during the transportation of the air supply device, the hose support arm can better fix and support the combustion air intake hose; on the other hand, in the process of installing and combining the air supply device and the gas turbine device, the installer can pull out the combustion air intake hose with only a small push-pull force, so that the installer saves effort, and pulls the combustion air intake hose out more quickly and communicates with the gas turbine device.

In some examples, a rigid diversion structure is arranged inside the combustion air intake hose, so that an adverse effect on an air flow due to a shrinkage of the combustion air intake hose can be reduced.

For example, the combustion air intake hose can be connected with the combustion air intake port by bolts, so that a more stable and better sealing performance connection method can be provided. Of course, the embodiments of the present disclosure include but are not limited to this, the combustion air intake hose can also be connected with the combustion air intake interface by other connection methods.

In some examples, as shown in FIG. 1B, the air supply device 100 further includes a vertical plate 190, the vertical plate 190 is detachably connected with the sound insulation turnover mechanism 130, and is configured to form an accommodating space with the sound insulation turnover mechanism 130, and the combustion air intake hose 150 and the hose support arm 160 are located in the accommodating space.

In some examples, as shown in FIGS. 2A and 2B, the air supply device 100 further includes a through-hole air intake filter 171, a ventilation air intake fan 172, and a ventilation air intake interface 173; the ventilation air intake filter 171 is located in the air intake compartment 110; the ventilation air intake fan 172 is located in the air intake compartment 110, and is connected with the ventilation air intake filter 171; the ventilation air intake interface 173 is located on the tail plate 114, and is connected with the ventilation air intake fan 172. In this way, the ventilation air intake filter 171, the ventilation air intake fan 172, and the ventilation air intake interface 173 can form a ventilation air intake system 170, air can be filtered by the ventilation air intake filter 171, and then reach the ventilation air intake interface 173 through the ventilation air intake fan 172, so that ventilation air or cooling air can be provided to the gas turbine connected with the ventilation air intake interface 173. In this way, both the combustion air intake system and the ventilation air intake system are integrated in the air supply device, so that a degree of integration can be improved. It should be noted that although both the combustion air intake system and the ventilation air intake system provide air for the gas turbine device, they have different requirements for air quality.

For example, as shown in FIG. 1A, the air supply device 100 further includes a combustion air intake sealing plate 194 and a ventilation air intake sealing plate 116; the combustion air intake sealing plate 194 is arranged on the combustion air intake interface 123, and the ventilation air intake sealing plate 116 is arranged on the ventilation air intake interface 173. In this way, the combustion air intake sealing plate and the ventilation air intake sealing plate can respectively protect the combustion air intake system and the ventilation air intake system. It should be noted that the above-mentioned combustion air intake sealing plate and the ventilation air intake sealing plate are necessary to be removed in a case that the air supply device is connected with the gas turbine device.

In some examples, as shown in FIGS. 2A and 2B, the combustion air intake silencer 122 includes a first sub air intake silencer 1221 and a second sub air intake silencer 1222; the first sub air intake silencer 1221 is connected with the combustion air intake filter 121, the second sub air intake silencer 1222 is connected with the combustion air intake interface 123, a radial size of the second sub air intake silencer 1222 is smaller than a size of the first sub air intake silencer 1221; the ventilation air intake filter 171 is located around the first sub air intake silencer 1221, the ventilation air intake fan 172 is located on a side of the second sub air intake silencer 1222 close to the first bottom plate 113, and the ventilation air intake interface 173 is located on a side of the combustion air intake interface 123 close to the first bottom plate 113.

In the air supply device provided in the example, the combustion air intake silencer adopts a two-stage silencing mode including the above-mentioned first sub air intake silencer and the second sub air intake silencer, so that a length of the combustion air intake silencer can be fully extended and the noise reduction effect can be improved, and a loss of intake air pressure can also be reduced. In addition, since the ventilation air intake filter is located around the first sub air intake silencer, the ventilation air intake fan is located on a side of the second sub air intake silencer close to the first bottom plate. The air supply device can make full use of a space in the air intake compartment, to improve an integration degree of the air supply device, and reduce a volume of the air supply device. On the other hand, since the ventilation air intake fan is installed in the air supply device, not installed in the gas turbine device, therefore, the air supply device can also reduce a weight of the gas turbine device.

In some examples, as shown in FIGS. 2A and 2B, the combustion air intake silencer 122 includes a silencer connection portion 1223, which connects the first sub air intake silencer 1221 and the second sub air intake silencer 1222; in a direction from the first sub air intake silencer 1221 to the second sub air intake silencer 1222, a radial size of the silencer connection portion 1223 gradually decreases.

For example, as shown in FIG. 2A and FIG. 2B, a ventilation silencer 174 can also be arranged on the gas turbine device 200, the ventilation silencer 174 is connected with the ventilation air intake interface 173; for example, the ventilation air intake fan 172 and the ventilation silencer 174 may be connected by a square-to-circle connector 175.

In some examples, as shown in FIG. 1A, two ventilation air intake interfaces 173 are arranged, the two ventilation air intake interfaces 173 are respectively located on a side of the combustion air intake interface 123 close to the first bottom plate 113, and are respectively located on two sides of the combustion air intake interface 123 in a direction parallel to the first bottom plate 113. In this way, the air supply device can make full use of the space on the tail plate, and the degree of integration is improved.

In some examples, as shown in FIGS. 2A and 2B, the air intake compartment 110 includes a filter compartment 110A and a silencer compartment 110B sequentially arranged in a length direction of the first bottom plate 113, the combustion air intake filter 121 is located in the filter compartment 110A, and the combustion air intake silencer 122 is located in the silencer compartment 110B.

In some examples, as shown in FIGS. 2A and 2B, the combustion air intake filter 121 includes a plurality of sub combustion air intake filters 1210, which are located at an edge of the first bottom plate 113 of the filter compartment 110A, and are used as a side plate of the filter compartment 110A, so that on the one hand, the space utilization rate of the air intake compartment can be improved, and on the other hand, an air intake volume can be increased.

In some examples, as shown in FIG. 1A, the air supply device 100 further includes a walking mechanism 190, and the walking mechanism 190 is configured to carry and transport the air intake compartment 110. In this way, the air supply device 100 may be an air supply vehicle. Of course, the embodiments of the present disclosure include but are not limited to this, the air supply device can also be an air supply skid.

Figure 5:
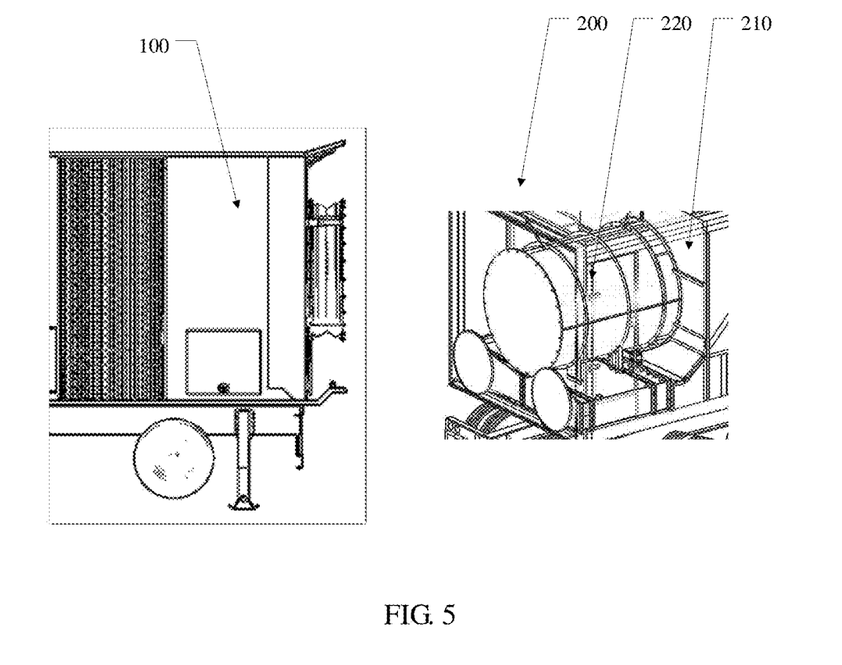
FIG. 5 is a schematic diagram of a gas turbine system provided by an embodiment of the present disclosure.
Figure 6:
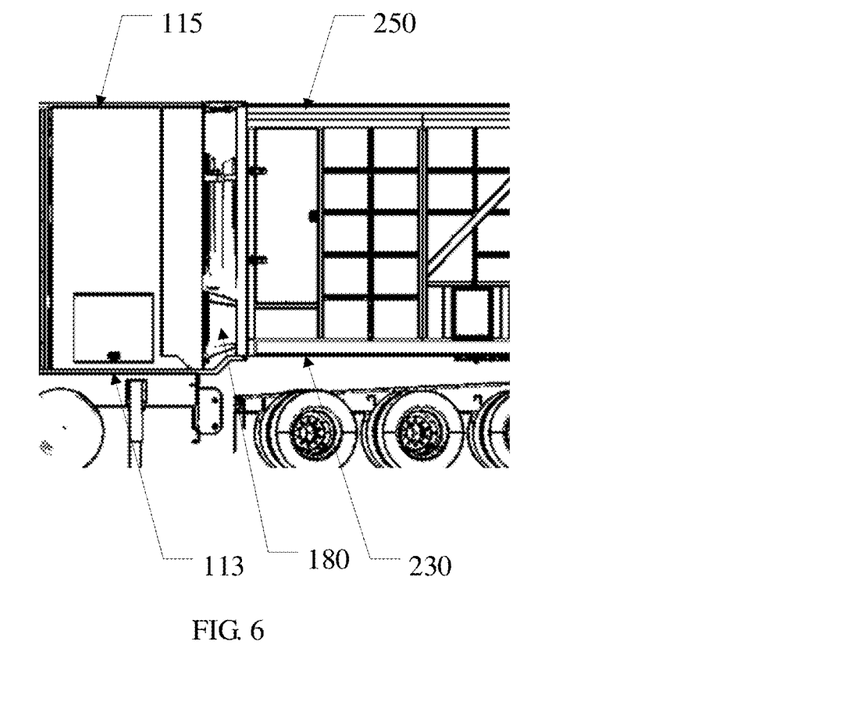
FIG. 6 is a schematic diagram of another gas turbine system provided by an embodiment of the disclosure.

An embodiment of the present disclosure further provides a gas turbine system. FIG. 5 is a schematic diagram of a gas turbine system provided by an embodiment of the present disclosure; FIG. 6 is a schematic diagram of another gas turbine system provided by an embodiment of the disclosure. As shown in FIG. 5 and FIG. 6, the gas turbine system 300 includes the air supply device 100 and the gas turbine device 200 provided in any one of the above examples; the gas turbine device 200 includes a gas turbine 210 and an air intake cylinder 220, an end of the air intake cylinder 220 is communicated with the gas intake interface 123 of the air supply device 100, another end of the air intake cylinder is connected with the gas turbine 210. Since the gas turbine system includes the air supply device provided by any one of the above examples, the gas turbine system has technical effects corresponding to the beneficial technical effects of the above air supply device. For example, the gas turbine system can realize a rapid installation and combination of the air supply device and the gas turbine device, and the noise can be reduced. On the other hand, the above-mentioned air intake cylinder can provide a buffer transition for the air passing through the gas intake silencer and the gas intake interface, to ensure that the air entering the gas turbine is uniform and stable.

In some examples, as shown in FIG. 5, a protective net is arranged inside the air intake cylinder 220, to prevent debris from the combustion air intake system from entering and damaging the gas turbine.

In some examples, as shown in FIG. 6, the gas turbine device 200 includes a second bottom plate 230, the gas turbine 210 is arranged on the second bottom plate 230; the air intake compartment 110 of the air supply device 100 further includes a first top plate 115 arranged opposite to the first bottom plate 113, the gas turbine device 200 includes a second top plate 250 arranged opposite to the second bottom plate 230, a distance between the first top plate 115 and the first bottom plate 113 is greater than a distance between the second top plate 250 and the second bottom plate 230. That is, the first bottom plate 113 of the air intake compartment 110 of the air supply device 100 is lowered to a certain height, so that an area of the tail plate 114 is increased, which facilitates a placement of the combustion air intake interface 123 and the ventilation air intake interface 173 mentioned above.

In some examples, as shown in FIG. 6, the gas turbine system 300 further includes a ventilation air intake hose 180, an end of the ventilation air intake hose 180 is connected with the ventilation air intake interface 173, another end of the ventilation air intake hose 180 is configured to be connected with the gas turbine device 200, during the transportation of the air supply device, the above-mentioned ventilation air intake hose can be placed in the gas turbine device 200, in the process of installing and combining the air supply device and the gas turbine device, only the combustion air intake hose can be pulled out to communicate with the gas turbine device. In this way, the combustion air intake interface can be quickly connected with the gas turbine device through the above-mentioned ventilation air intake hose. In addition, because the ventilation air intake hose is installed in the gas turbine device, the operator will not be obstructed during a connection process of the combustion air intake hose.

In some examples, bolts can be used to connect the combustion air intake hose with the air intake cylinder, so that an absolute sealing and stability between the combustion air intake hose and an air intake tube are ensured; on the other hand, a clamp can be used to connect the ventilation air intake hose with the ventilation air intake interface, so that the installation and combination speed between the air supply device and the gas turbine device can be further improved.

In some examples, the gas turbine system may be a gas turbine power generation system, so that a mobile, small, light, high-efficiency, and high-power power generation system can be provided, thus the gas turbine power generation device can be transported to various scenarios with insufficient power or no power, so that the power demand of users can be met. Of course, the embodiments of the present disclosure include but are not limited to this, the gas turbine system can also be a gas turbine fracturing system, which uses power output from the gas turbine to drive a fracturing pump to pressurize a fracturing fluid.

Figure 7:
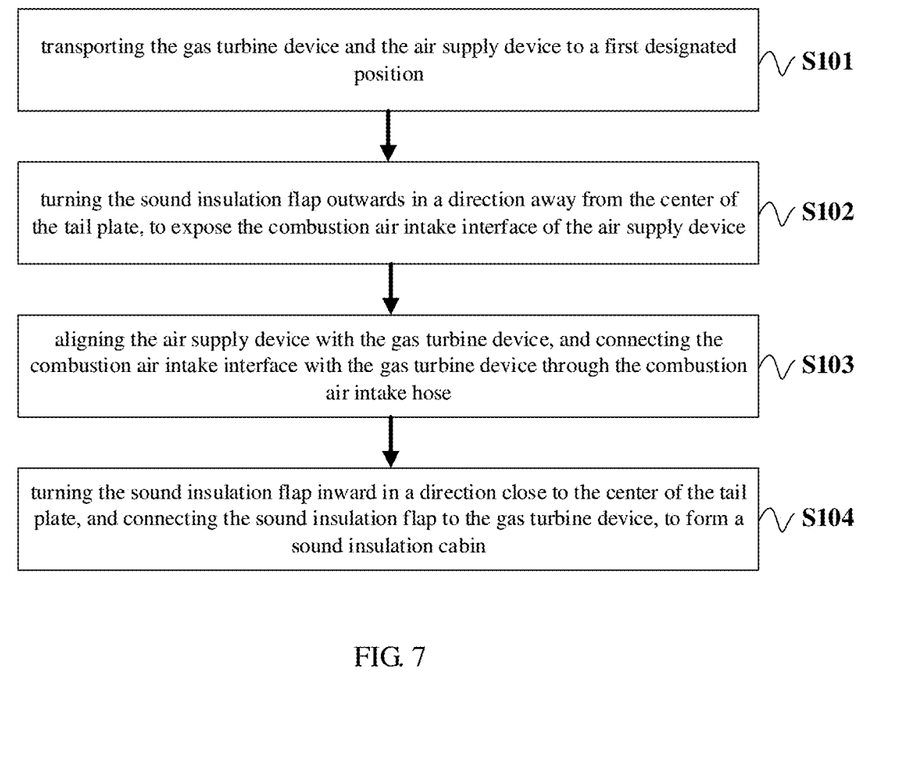
FIG. 7 is a flowchart of a method for using a gas turbine system provided by an embodiment of the disclosure.

An embodiment of the present disclosure further provides a method for using the gas turbine system. FIG. 7 is a flowchart of a method for using a gas turbine system provided by an embodiment of the present disclosure. As shown in FIG. 7, the method for using the gas turbine system includes the following steps S101-S104:

Step S101: transporting the gas turbine device and the air supply device to a first designated position.

For example, in a case that the gas turbine device and the air supply device do not include a walking mechanism, a trailer can be used to transport the gas turbine plant and the air supply device to the first designated position; in a case that the gas turbine device and the air supply device themselves include a walking mechanism, the gas turbine device and the air supply device can be transported to the first designated position through the walking mechanism.

Step S102: turning the sound insulation flap outward in a direction away from the center of the tail plate, to expose the combustion air intake interface of the air supply device.

For example, the operator can manually or use a turnover mechanism to turn the sound insulation flap outward in a direction away from the center of the tail plate, to expose the combustion air intake interface of the air supply device.

Step S103: aligning the air supply device with the gas turbine device, and connecting the combustion air intake interface with the gas turbine device through the combustion air intake hose.

For example, the above-mentioned alignment includes alignment in a width direction of the air supply device, which further includes the alignment in a length direction of the air supply device, the sound insulation flap partially overlaps with the gas turbine device in the length direction of the air supply device, for example, overlapping by 100 mm. In addition, the combustion air intake hose can be pulled out from the air supply device, and then is docked with the air intake tube in the gas turbine device.

Step S104: turning the sound insulation flap inward in a direction close to the center of the tail plate, and connecting the sound insulation flap to the gas turbine device, to form a sound insulation cabin.

In the method for using the gas turbine system provided by the embodiment of the present disclosure, in the process of transporting the gas turbine device and the air supply device to the first designated position, the sound insulation turnover mechanism can form an enclosed space located behind the tail plate with some detachable vertical plates, the enclosed space can accommodate the combustion air intake interface and other auxiliary equipments connected with the combustion air intake interface, such as a combustion air intake hose or a support arm, so that the combustion air intake interface and other auxiliary equipments connected with the combustion air intake interface can be protected during transportation; after the air supply device is transported to the first designated position, the sound insulation flap can be driven to turn outward relative to the tail plate through the above-mentioned turnover mechanism, so that the combustion air intake interface can be quickly exposed, then the combustion air intake interface can be quickly connected with the gas turbine device through the combustion air intake hose; in a case that the air supply device is connected with the gas turbine device and is in a working state, the sound insulation flap can be driven to turn inward with respect to the tail plate through the above-mentioned turnover mechanism, and the sound insulation flap can be connected with the gas turbine device, to form a sound insulation cabin, so that the noise at the position of the combustion air intake interface can be reduced. In this way, the air supply device can not only increase the installation and combination speed of the air supply device and the gas turbine device, but also reduce the noise.

In some examples, the method for using the gas turbine system further includes: fixing an end of the sound insulation flap away from the air intake compartment to the gas turbine device. In this way, the above-mentioned sound insulation cabin can be better fixed and sealed, to enhance a noise reduction effect of the sound insulation cabin.

For example, hooks, pins and other connecting pieces can be used to fix the end of the sound insulation flap away from the air intake compartment to the gas turbine device.

In some examples, the method for using the gas turbine system further includes: after forming the sound insulation cabin, turning the sound insulation turnover device outward in a direction away from the center of the tail plate, to expose the combustion air intake hose; keeping the state that the combustion air intake hose connecting the combustion air intake interface with the gas turbine device, and using a hinged structure to articulate the air supply device and the gas turbine device; and transporting the air supply device and the gas turbine device as a whole to a second designated position. In this way, fast short-distance transfer can be performed while maintaining the state that the combustion air intake hose connecting the combustion air intake interface with the gas turbine device.

In some examples, in a case that the air supply device includes the above-mentioned vertical plate, in the step S102, before turning the sound insulation flap outward in a direction away from the center of the tail plate, the using method further includes removing the vertical plate.

The following points required to be explained:
(1) the drawings of the embodiments of the present disclosure only relate to the structures related to the embodiments of the present disclosure, and other structures can refer to the general design.
(2) without conflict, the embodiments of the present disclosure and the features in the embodiments may be combined with each other to obtain new embodiments.

The above are merely particular embodiments of the present disclosure but are not limitative to the scope of the present disclosure; any of those skilled familiar with the related arts can easily conceive variations and substitutions in the technical scopes disclosed by the present disclosure, which should be encompassed in protection scopes of the present disclosure. Therefore, the scopes of the present disclosure should be defined by the appended claims.

What is claimed is:
1. An air supply device, comprising:
an air intake compartment, comprising a connection end, and the connection end being configured to be connected with a gas turbine device;
a combustion air intake filter, located in the air intake compartment;
a combustion air intake silencer, located in the air intake compartment and connected with the combustion air intake filter;
a combustion air intake interface, connected with the combustion air intake silencer; and a sound insulation turnover mechanism, comprising a sound insulation flap and a turnover mechanism, wherein: the air intake compartment comprises a first bottom plate and a tail plate that is located at the connection end, the tail plate is intersected with the first bottom plate, the combustion air intake interface is located on the tail plate, and the sound insulation flap is located at the connection end, and the turnover mechanism is connected with the sound insulation flap and is configured to drive the sound insulation flap to rotate relative to the tail plate.

2. The air supply device according to claim 1, wherein: the sound insulation flap comprises a first sub sound insulation flap, the first sub sound insulation flap is hingedly connected with a first edge of the connection end away from the first bottom plate, the turnover mechanism comprises a first sub turnover mechanism, the first sub turnover mechanism is respectively connected with the first sub sound insulation flap and the tail plate, and the first sub turnover mechanism is configured to drive the first sub sound insulation flap to rotate relative to the tail plate.

3. The air supply device according to claim 2, wherein: the sound insulation flap comprises a second sub sound insulation flap and a third sub sound insulation flap, the second sub sound insulation flap is hingedly connected with a second edge of the connection end adjacent to the first edge, the third sub sound insulation flap is hingedly connected with a third edge of the connection end adjacent to the first edge, and the second edge and the third edge are two opposite edges of the connection end.

4. The air supply device according to claim 3, wherein the first bottom plate further comprises:

a bottom plate extension portion, the bottom plate extension portion extending from the connection end in a direction away from the tail plate, and the bottom plate extension portion, the first sub sound insulation flap, the second sub sound insulation flap, and the third sub sound insulation flap being configured to enclose a sound insulation cabin with the gas turbine device.

5. The air supply device according to claim 3, wherein a silencing structure is arranged on a side of the sound insulation flap close to a center of the tail plate.

6. The air supply device according to claim 1, further comprising:

a combustion air intake hose; and a hose support arm, wherein: an end of the combustion air intake hose is connected with the combustion air intake interface, another end of the combustion air intake hose is configured to be connected with the gas turbine device, one end of the hose support arm is connected with the tail plate, and another end of the hose support arm is connected with the combustion air intake hose and is configured to support the combustion air intake hose.

7. The air supply device according to claim 6, further comprising:

a vertical plate, wherein the vertical plate is detachably connected with the sound insulation turnover mechanism, and is configured to form an accommodating space with the sound insulation turnover mechanism and the combustion air intake hose and the hose support arm are located in the accommodating space.

8. The air supply device according to claim 1, further comprising:

a ventilation air intake filter, located in the air intake compartment;

a ventilation air intake fan, located in the air intake compartment and connected with the ventilation air intake filter; and a ventilation air intake interface, located on the tail plate and being connected with the ventilation air intake fan.

9. The air supply device according to claim 8, wherein: the combustion air intake silencer comprises a first sub air intake silencer and a second sub air intake silencer, the first sub air intake silencer is connected with the combustion air intake filter, the second sub air intake silencer is connected with the combustion air intake interface, and a radial size of the second sub air intake silencer is smaller than a size of the first sub air intake silencer, and the ventilation air intake filter is located around the first sub air intake silencer, the ventilation air intake fan is located on a side of the second sub air intake silencer close to the first bottom plate, and the ventilation air intake interface is located on a side of the combustion air intake interface close to the first bottom plate.

10. The air supply device according to claim 1, wherein: two ventilation air intake interfaces are provided, and the two ventilation air intake interfaces are respectively located on a side of the combustion air intake interface close to the first bottom plate and are respectively located on two sides of the combustion air intake interface in a direction parallel to the first bottom plate.

11. The air supply device according to claim 1, wherein: the air intake compartment comprises a filter compartment and a silencing compartment arranged in sequence in a length direction of the first bottom plate, the combustion air intake filter is located in the filter compartment, and the combustion air intake silencer is located in the silencing compartment.

12. The air supply device according to claim 11, wherein the combustion air intake filter comprises a plurality of sub combustion air intake filters, is located at an edge of the first bottom plate of the filter compartment, and functions as a side plate of the filter compartment.

13. The air supply device according to claim 1, wherein: the combustion air intake silencer comprises a silencer connection portion, a first sub air intake silencer, and a second sub air intake silencer, the silencer connection portion connecting with the first sub air intake silencer and the second sub air intake silencer, and in a direction from the first sub air intake silencer to the second sub air intake silencer, a radial size of the silencer connection portion gradually decreases.

14. The air supply device according to claim 1, further comprising:

a walking mechanism, wherein the walking mechanism is configured to carry and transport the air intake compartment.

15. A gas turbine system, comprising:

the air supply device according to claim 1; and the gas turbine device, comprising a gas turbine and an air intake cylinder, an end of the air intake cylinder is communicated with the combustion air intake interface of the air supply device, and another end of the air intake cylinder is connected with the gas turbine.

16. The gas turbine system according to claim 15, wherein:

the gas turbine device comprises a second bottom plate and the gas turbine is located on the second bottom plate, and the air intake compartment comprises a first top plate arranged opposite to the first bottom plate, the gas turbine device comprises a second top plate arranged opposite to the second bottom plate, and a distance between the first top plate and the first bottom plate is greater than a distance between the second top plate and the second bottom plate.

17. The gas turbine system according to claim 16, further comprising:
  a ventilation air intake hose,
  wherein: an end of the ventilation air intake hose is connected with a ventilation air intake interface, another end of the ventilation air intake hose is configured to be connected to the gas turbine device.

* * * * *